United States Patent
Fogwill et al.

(10) Patent No.: US 11,473,998 B2
(45) Date of Patent: Oct. 18, 2022

(54) SYSTEM AND METHOD FOR DETECTING HIGH PRESSURE SEAL LEAKS IN CHROMATOGRAPHIC PUMPS

(71) Applicant: Waters Technologies Corporation, Milford, MA (US)

(72) Inventors: Michael O. Fogwill, Uxbridge, MA (US); Jason F. Hill, Milford, MA (US)

(73) Assignee: Waters Technologies Corporation, Milford, MA (US)

(*) Notice: Subject to any disclaimer, the term of this patent is extended or adjusted under 35 U.S.C. 154(b) by 337 days.

(21) Appl. No.: 16/718,872

(22) Filed: Dec. 18, 2019

(65) Prior Publication Data
US 2020/0200642 A1 Jun. 25, 2020

Related U.S. Application Data

(60) Provisional application No. 62/782,593, filed on Dec. 20, 2018.

(51) Int. Cl.
| | |
|---|---|
| G01M 3/28 | (2006.01) |
| G01N 21/41 | (2006.01) |
| G01N 30/28 | (2006.01) |
| G01N 30/62 | (2006.01) |
| G01N 30/32 | (2006.01) |

(52) U.S. Cl.
CPC .......... *G01M 3/2869* (2013.01); *G01N 21/41* (2013.01); *G01N 30/28* (2013.01); *G01N 30/32* (2013.01); *G01N 30/62* (2013.01); *G01N 2030/326* (2013.01)

(58) Field of Classification Search
CPC ...... G01N 3/2869; G01N 30/32; G01N 30/62; G01N 2030/326
See application file for complete search history.

(56) References Cited

U.S. PATENT DOCUMENTS

| | | | | |
|---|---|---|---|---|
| 2003/0173272 | A1* | 9/2003 | Staffler | G01N 30/36 340/606 |
| 2006/0070880 | A1* | 4/2006 | Goudberg | G01N 27/44704 204/603 |
| 2015/0285239 | A1* | 10/2015 | Shoykhet | G01N 30/32 417/63 |
| 2016/0169223 | A1* | 6/2016 | Paul | F04B 9/12 417/63 |

FOREIGN PATENT DOCUMENTS

DE 102019210623 A1 * 1/2021

* cited by examiner

*Primary Examiner* — Nathaniel J Kolb
(74) *Attorney, Agent, or Firm* — Deborah M. Vernon

(57) ABSTRACT

The present disclosure relates to techniques for detecting leaks in a pump. A compressed fluid, such as compressed $CO_2$, is provided through a first channel formed within a pump head. The compressed fluid within the first channel is in contact with at least a portion of a pump piston, and the first channel is substantially sealed using a fluid seal positioned around a portion of the pump piston. A wash fluid is pumped into a second channel formed within a wash seal housing associated with the pump head using a fluid pump. The wash fluid within the second channel surrounds a portion of the pump piston and is separated from the first channel by the fluid seal. A flow rate of fluid exiting the wash seal housing via the second channel is measured, and the existence of a leak is determined based on the measured flow rate.

18 Claims, 4 Drawing Sheets

SYSTEM AND METHOD FOR DETECTING HIGH PRESSURE SEAL LEAKS IN CHROMATOGRAPHIC PUMPS

CROSS-REFERENCE TO RELATED APPLICATIONS

This application claims the benefit of and priority to U.S. Provisional Patent Application No. 62/782,593 filed Dec. 20, 2018 titled "SYSTEM AND METHOD FOR DETECTING HIGH PRESSURE SEAL LEAKS IN CHROMATOGRAPHIC PUMPS," the entire contents of which is hereby incorporated by reference in its entirety.

FIELD OF THE TECHNOLOGY

The present disclosure generally relates to pressurized fluid systems used in chromatography. In particular, the present disclosure relates to systems and methods for detecting leaks within a pressurized fluid system.

BACKGROUND

Chromatography involves the flowing of a mobile phase over a stationary phase to effect separation. To speed-up and enhance the efficiency of the separation, pressurized mobile phases can be introduced. Carbon dioxide based chromatographic systems use $CO_2$ as a component of the mobile phase flow stream, and the $CO_2$ based mobile phase is delivered from one or more high pressure pumps and carried through the separation column as a pressurized liquid. The $CO_2$ based mobile phase is used to carry components of the analytes in a sample through the chromatography column to the detection system.

SUMMARY

Detecting leaks within chromatography systems raises a number of challenges, especially when dealing with a highly compressible fluid such as $CO_2$ or a $CO_2$-based mobile phase. Technology for continuously detecting leaks within a high pressure fluid pump would be beneficial and highly desirable.

According to one aspect of the present disclosure, a method for detecting leaks within a pump is disclosed. The method includes providing a compressed fluid through a first channel formed within a pump head, wherein the compressed fluid within the first channel is in contact with at least a portion of a pump piston and the first channel is substantially sealed using a fluid seal positioned around a portion of the pump piston. The method also includes providing a wash fluid into a second channel formed within a wash seal housing associated with the pump head using a fluid pump, wherein the wash fluid within the second channel surrounds a portion of the pump piston and is separated from the first channel by the fluid seal. The method also includes measuring a flow rate of fluid exiting the wash seal housing via the second channel. The method also includes determining existence of a leak in the fluid seal based on the measured flow rate. In a non-limiting example, the compressed fluid includes compressed $CO_2$ for a $CO_2$-based chromatography or extraction system. In another non-limiting example, determining the existence of a leak in the fluid seal includes comparing the measured flow rate exiting the wash seal housing against a flow rate threshold value. In another non-limiting example, determining the existence of a leak in the fluid seal includes detecting a bubble in the fluid exiting the wash seal housing using a bubble detector. In another non-limiting example, a sensitivity value of the bubble detector is determined based on a compressibility value associated with the compressed fluid being pumped through the first channel. In another non-limiting example, the method also includes changing a pump speed of the pump piston in response to a detected leak in the fluid seal in order to maintain a constant flow rate of the fluid exiting the pump head. In another non-limiting example, the method also includes generating a notification to a user indicating that a leak has been detected. In another non-limiting example, determining the existence of a leak includes measuring a composition of the wash fluid against a nominal value, and the composition of the wash fluid is determined by a refractive index measurement.

According to another aspect of the present disclosure, a system for detecting leaks in a pump is disclosed. The system includes a pump head including an interior portion defining a first channel within the pump head. The system also includes a first fluid reservoir configured to direct a compressed fluid through the first channel. The system also includes a pump piston configured to partially move within the first channel such that the compressed fluid within the first channel is in contact with at least a portion of the pump piston. The system also includes a fluid seal positioned around a portion of the pump piston to substantially seal the first channel. The system also includes a wash seal housing associated with the pump head and including an interior portion defining a second channel within the wash seal housing. The system also includes a fluid supply configured to provide a wash fluid through second channel such that the wash fluid surrounds a portion of the pump piston and is separated from the first channel by the fluid seal. The system also includes a flow rate sensor configured to measure a flow rate of fluid exiting the wash seal housing via the second channel. In a non-limiting example, the system also includes a computing device configured to control operation of the pump piston and the fluid supply; and determine an existence of a leak in the fluid seal based on the flow rate measured by the flow rate sensor. In another non-limiting example, the computing device is further configured to change a pump speed of the pump piston in response to a leak detected in the fluid seal in order to maintain a constant flow rate of the fluid exiting the pump head. In another non-limiting example, the computing device is further configured to generate a notification to a user indicating that a leak has been detected. In another non-limiting example, the computing device is further configured to compare the measured flow rate exiting the wash seal housing against a flow rate threshold value. In another non-limiting example, determining the existence of a leak includes measuring a composition of the wash fluid against a nominal value, wherein the composition of the wash fluid is determined by a refractive index measurement. In another non-limiting example, the first fluid reservoir is configured to provide compressed $CO_2$ to the pump head for use in a $CO_2$-based chromatography or extraction system. In another non-limiting example, the flow rate sensor includes a bubble detector configured to detect a bubble in the fluid exiting the wash seal housing. In another non-limiting example, a sensitivity value of the bubble detector is determined based on a compressibility value associated with the compressed fluid being pumped through the first channel.

According to another aspect of the present disclosure, a method for detecting leaks within a $CO_2$ pump is disclosed. The method includes providing compressed $CO_2$ through a first channel formed within a pump head, wherein the compressed $CO_2$ within the first channel is in contact with at least a portion of a pump piston and the first channel is substantially sealed using a fluid seal positioned around a portion of the pump piston. The method also includes providing a wash fluid into a second channel formed within a wash seal housing associated with the pump head using a fluid pump, wherein the wash fluid within the second channel surrounds a portion of the pump piston and is separated from the first channel by the fluid seal. The method also includes measuring a flow rate of fluid exiting the wash seal housing via the second channel. The method also includes comparing the measured flow rate of the fluid exiting the wash seal housing via the second channel against a flow rate threshold value. The method also includes determining existence of a leak in the fluid seal if the measured flow rate is higher than the flow rate threshold value, or if a bubble is detected exiting the second channel. In a non-limiting example, the method also includes changing a pump speed of the pump piston in response to a detected leak in the fluid seal in order to maintain a constant flow rate of the compressed $CO_2$ exiting the pump head. In another non-limiting example, the method also includes generating a notification to a user indicating that a leak has been detected.

The above aspects of the technology provide numerous advantages. For example, systems and methods of the present technology allow for quick identification of a leak within a high pressure fluid pump and can generate a notification when a pump leak is detected. Such systems can also continuously detect leaks within a high pressure pump without the need to perform offline testing, and they can also specifically identify the location of a leak in a high pressure seal.

It should be appreciated that all combinations of the foregoing concepts and additional concepts discussed in greater detail below (provided such concepts are not mutually inconsistent) are contemplated as being part of the inventive subject matter disclosed herein. In particular, all combinations of claimed subject matter appearing at the end of this disclosure are contemplated as being part of the inventive subject matter disclosed herein. It should also be appreciated that terminology explicitly employed herein that also may appear in any disclosure incorporated by reference should be accorded a meaning most consistent with the particular concepts disclosed herein.

BRIEF DESCRIPTION OF THE DRAWINGS

One of ordinary skill in the art will understand that the drawings primarily are for illustrative purposes and are not intended to limit the scope of the inventive subject matter described herein. The drawings are not necessarily to scale; in some instances, various aspects of the subject matter disclosed herein may be shown exaggerated or enlarged in the drawings to facilitate an understanding of different features. In the drawings, like reference characters generally refer to like features (e.g., functionally similar and/or structurally similar elements).

Figure 1:
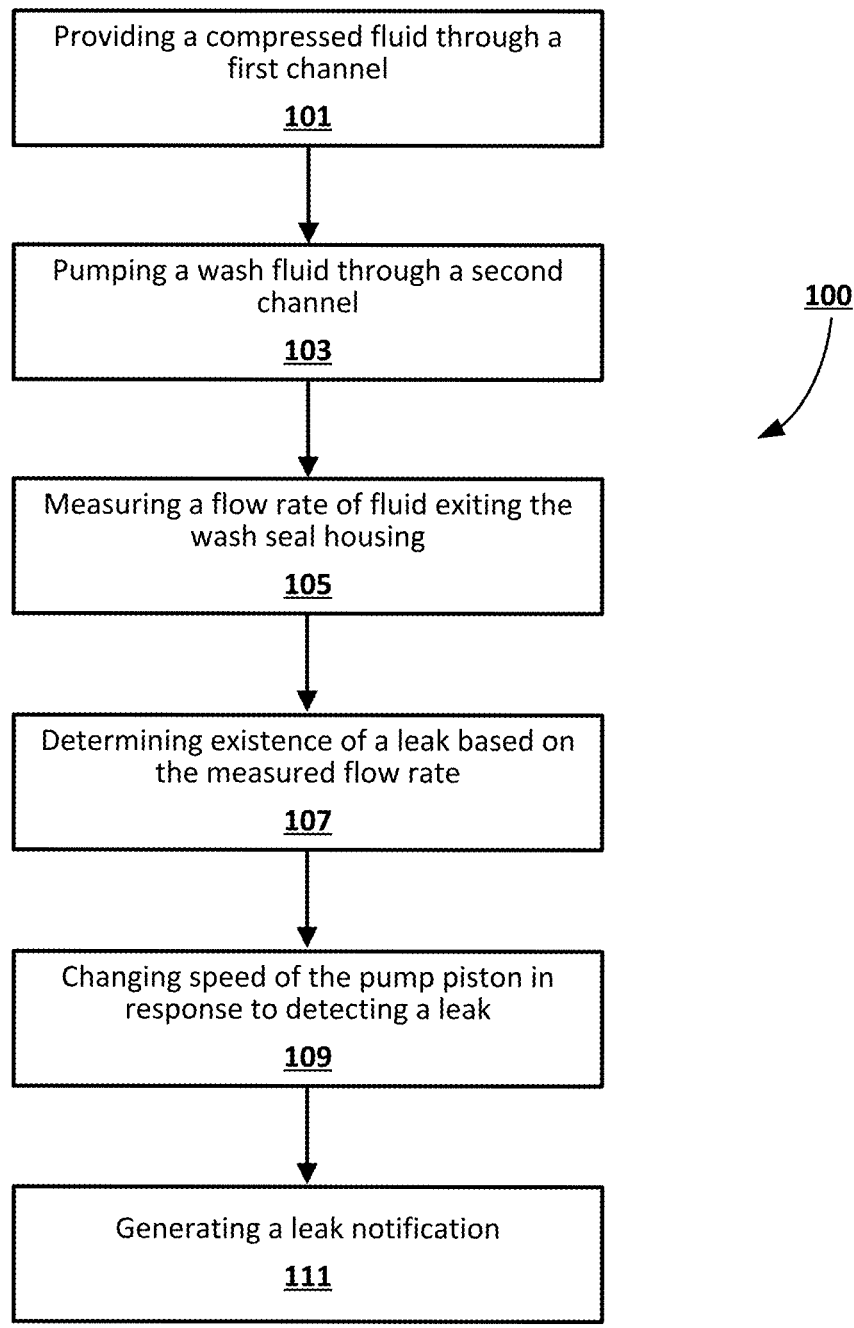
FIG. 1 is a flowchart illustrating an exemplary method for detecting a leak in a compressed fluid pump, according to an embodiment of the present disclosure

The features and advantages of the present disclosure will become more apparent from the detailed description set forth below when taken in conjunction with the drawings.

DETAILED DESCRIPTION

Following below are more detailed descriptions of various concepts related to, and embodiments of, methodologies, apparatus and systems for detecting leaks within a pump. It should be appreciated that various concepts introduced above and discussed in greater detail below may be implemented in any of numerous ways, as the disclosed concepts are not limited to any particular manner of implementation. Examples of specific implementations and applications are provided primarily for illustrative purposes.

As used herein, the term "includes" means includes but is not limited to, the term "including" means including but not limited to. The term "based on" means based at least in part on.

Chromatography or extraction systems may involve the pumping of compressible fluids, such as a compressible $CO_2$-based mobile phase. Mobile phase leaks should be avoided for robust performance of a chromatography or extraction system. A common location for leaks is the high pressure seals and the check valves within the chromatographic pump. These components are constantly moving (wearing) and are common failure points. Current preventative measures include periodic prophylactic replacement and regular performance tests to quantify leaks.

Leak detection performance tests are often measured by plunger displacement or pressure decay. During such tests, the pump outlet is blocked and the plungers are compressed to a set pressure. Either the pressure is held constant and the plunger displacement is measured, or the plunger is stopped and the pressure decay is recorded. Each can be compared against a threshold value or converted to a calculated leak rate to alert the operator of a potential leak in the system. Such leak rate measurement systems, however, may not be specific to the location of the leak. For example, the leak path may be through a failing check valve, out a leaking fitting, or past the high pressure seal at the plunger. Further, to run the leak detection test, the method must be interrupted.

This disclosure describes a novel leak detection system which is specific to the health of the high pressure seal and which does not require interruption of the chromatographic method. Seal leakage is often the most difficult to detect, the most common, and the most detrimental on chromatographic performance.

Modern pumping systems employ a seal wash system which floods the low pressure side of the high pressure seal with a solvent. This wash solvent or wash fluid is continuously or periodically pumped to remove shed seal material, precipitated mobile phase components, and to reduce seal friction. In alternative embodiments, the wash solvent can be gravity fed, siphoned, pulled, etc.

$CO_2$-based chromatography systems may encounter difficulties with the above described prior art diagnostic routines since the solvent is compressible. Plunger displacement rates and pressure decay rates are not linearly related to leak rates. Further, the novel method is applicable to $CO_2$-based fluid chromatography since the leaking fluid is $CO_2$ or a $CO_2$-based mobile phase, which experiences a large volume change with pressure fluctuations. $CO_2$ experiences a ~500× increase in volume as it decompresses across the high pressure seal during a leak. The leak rate would therefore be fairly easy to measure. For example, a 100 nL/min leak would result in a 50 µL/min increase in flow rate through the seal wash outlet line. Assuming, 1 mm inner diameter wash tubing, the 100 nL/min leak would translate into a flow rate increase of 1 mm/s. The flow meter could simply measure the velocity of a $CO_2$ gas bubble within the outlet seal wash tubing. The flow meter could measure the flow rate of the liquid wash solvent as well.

Since $CO_2$ would be gaseous in the outlet wash solvent line and the wash solvent is a liquid, two bubble detectors with a known volume between them could comprise a flow meter. Bubble detectors could also measure the volume of gas bubbles traveling out the seal wash which could be translated into a leak rate.

For liquid chromatography (LC) systems, the rate of change of the flow rate of the liquid wash solvent would be much lower in the event of a leak. Nevertheless, a flow meter with appropriate accuracy in the seal wash line could measure the leak rate. Detecting a change in composition of the wash solvent could also be calibrated to measure a leak. For example, with an isopropanol wash solvent, measuring water or acetonitrile content can quantify the leak rate and specify which pump is leaking.

FIG. 1 is a flowchart illustrating an exemplary method 100 for detecting leaks within a pump system, according to an exemplary embodiment. It will be appreciated that the method can be programmatically performed, at least in part, by one or more computer-executable processes executing on, or in communication with, one or more servers or other computing devices such as those described further below. In step 101, the method begins with providing a compressed fluid through a first channel within a pump head. In some example embodiments, the pump head is part of a $CO_2$-based chromatography or extraction system, and the compressed fluid includes a $CO_2$-based mobile phase. The fluid seal can include, for example, an O-ring or other type of elastomeric seal configured to make a substantially fluid-tight seal between a portion of the pump piston and the housing of the pump head. In alternative embodiments, the O-ring may be a non-elastomeric but otherwise compliant polymer, such as a soft metal which does not easily gall. In some example embodiments, the piston and seal may be precisely machined ceramics.

In step 103, a wash fluid is pumped or introduced into a second channel formed within a wash seal housing. In a non-limiting embodiment, the wash seal housing is associated with the pump head, and the wash fluid is introduced within the second channel using a fluid pump. In another non-limiting example, the wash fluid within the second channel surrounds a portion of the pump piston and is separated from the first channel by the fluid seal.

In step 105, the flow rate of fluid exiting the second channel through the wash seal housing is measured. In a non-limiting example, a flow meter can be positioned at or near the exit of the wash seal housing along the second channel and can be configured to measure and record the flow rate of fluid exiting the second channel.

In step 107, the existence of a leak can be determined, using a leak detection module as described below, based on the measured flow rate of the fluid exiting the second channel. In a non-limiting example, the flow rate of the wash fluid exiting the second channel should be a known value if there is no breach in the seal separating the first channel from the second channel. However, if the highly compressed fluid (e.g. $CO_2$) flowing within the first channel breaches the fluid seal and accesses the second channel where the wash fluid is flowing, it can significantly expand and increase the flow rate of fluid exiting the wash seal housing via the second channel. In a non-limiting example, the flow rate measured in step 105 can be compared against a flow rate threshold value, and the existence of a leak in the fluid seal can be determined based on the comparison. In another non-limiting example, highly compressed $CO_2$ can cause bubbles within the second channel in addition to or instead of increasing the flow rate of fluid exiting the wash seal housing via the second channel. In such cases, the flow meter can include a bubble detector configured to determine the existence of a leak based on the measurement of a bubble within the second channel. The sensitivity of such a bubble detector can be determined, at least in part, based on a compressibility value associated with the compressed fluid being pumped through the first channel. In another non-limiting example, the severity of the leak can be determined based on the size or number of bubbles exiting the second channel, or the increase in volume exiting the second channel.

In step 109, the speed of the pump piston can optionally be changed in response to detecting a leak in the fluid seal. In some embodiments, the speed of the pump piston can be controlled and/or changed in order to account for a leak in the fluid seal and maintain a constant flow rate of the compressed fluid exiting the pump head via the first channel.

In step 111, a notification is generated, using a notification module as described below, in order to notify a user that a leak has been detected in the fluid seal. In a non-limiting example, the notification can be an audio or visual notification that may be transmitted to a mobile electronic device associated with the user. The notification can indicate to the user the severity of the leak, in some embodiments.

Figure 2:
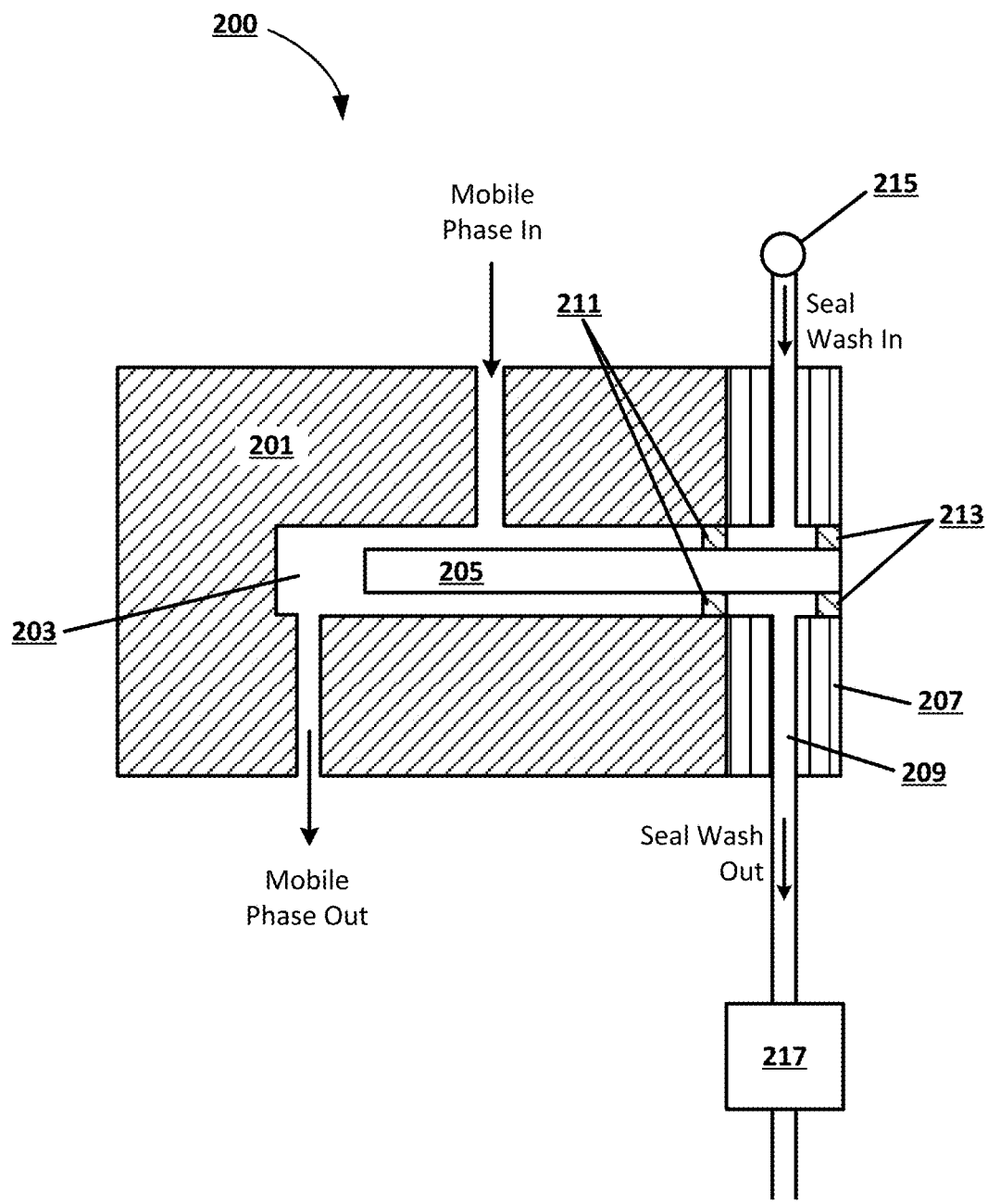
FIG. 2 is a cross sectional view of an example pump and leak detection system, according to an embodiment of the present disclosure.

FIG. 2 shows a non-limiting example pump 200 that can detect the existence of a leak, according to an embodiment of the present disclosure. In this example embodiment, the pump 200 includes a pump head 201, and a wash seal housing 207. A portion of the pump head 201 defines a first channel 203, through which a compressed fluid is configured to flow. In a non-limiting example, the pump 200 is part of a $CO_2$-based chromatography or extraction system, and the compressed fluid is a $CO_2$-based mobile phase. The pump 200 also includes a pump piston 205 that is configured to partially enter the first channel 203. A fluid seal 211 is configured to surround or engage with a portion of the pump piston 205 and is configured to create a substantially fluid tight seal between the pump head 201 and the wash seal housing 207. In a non-limiting example, the fluid seal 211 can include an O-ring or other suitable type of elastomeric or compliant seal.

A portion of the wash seal housing 205 defines a second channel 209 through which a wash fluid is configured to flow. In a non-limiting example, the wash fluid is configured to surround a portion of the pump piston 205, and the fluid seal 211 creates a substantially fluid tight seal between the compressed fluid within the first channel 203 and the wash fluid within the second channel 209. The pump 200 can also include a second fluid seal 213 configured to seal the second channel 209 along another portion of the pump piston 205. In some embodiments, the wash fluid can be provided to the second channel 209 using a fluid pump 215, and the flow rate of fluid exiting the second channel 209 can be measured using a sensor 217, such as a flow rate sensor. In one example embodiment, a check valve or other device prevents backflow of the wash solvent and ensures that the contents of the wash housing are directed to the leak sensor. If there is no leak in the fluid seal 211 separating the first channel 203 from the second channel 209, then the flow rate detected by the sensor 217 should substantially correspond to the flow rate of the fluid pump 215. If, however, there is a leak in the fluid seal 211 separating the compressible fluid within the first channel 211 from the wash fluid within the second channel 209, then a substantial increase in flow rate exiting the second channel 209 may be detected, or a bubble may be detected at the sensor 217. In a non-limiting example, the sensor 217 can include a bubble detector configured to detect bubbles in the fluid exiting the second channel 209. In such an example, the sensitivity of the bubble detector can be dependent upon a compressibility value associated with the compressed fluid flowing through the first channel 203. In another non-limiting example, the sensor 217 can compare the flow rate exiting the second channel 209 against a threshold value. This threshold value can also be based upon a compressibility value associated with the compressed fluid flowing through the first channel 203. A leak though the high pressure fluid seal 211 would enter the second channel 209, which is the seal wash flow path. Accordingly, the displacement of the seal wash solvent can be a continuous measure of high pressure seal leak. Placing a sensor 217 on the outlet of the seal wash can provide continuous feedback on the seal leak rate. In some embodiments, this leak detection system 200 can be continuously monitored without interrupting the chromatographic run or, run in concert with conventional leak detection methods to provide specific detail about high pressure leak rates.

In another non-limiting example, the sensor 217 can measure the composition of the fluid exiting the second channel 209 and determine a leak in the fluid seal 211 based on a detecting the presence of the fluid flowing through the first channel 203. Such a design could be implemented in a LC system in order to determine a leak where the increase in flow rate may not be as dramatic compared with a $CO_2$-based chromatography system. In one example embodiment, the sensor can be an optical device configured to measure the refractive index of the fluid. Changes in the refractive index may indicate changes in the composition of the fluid.

Figure 3:
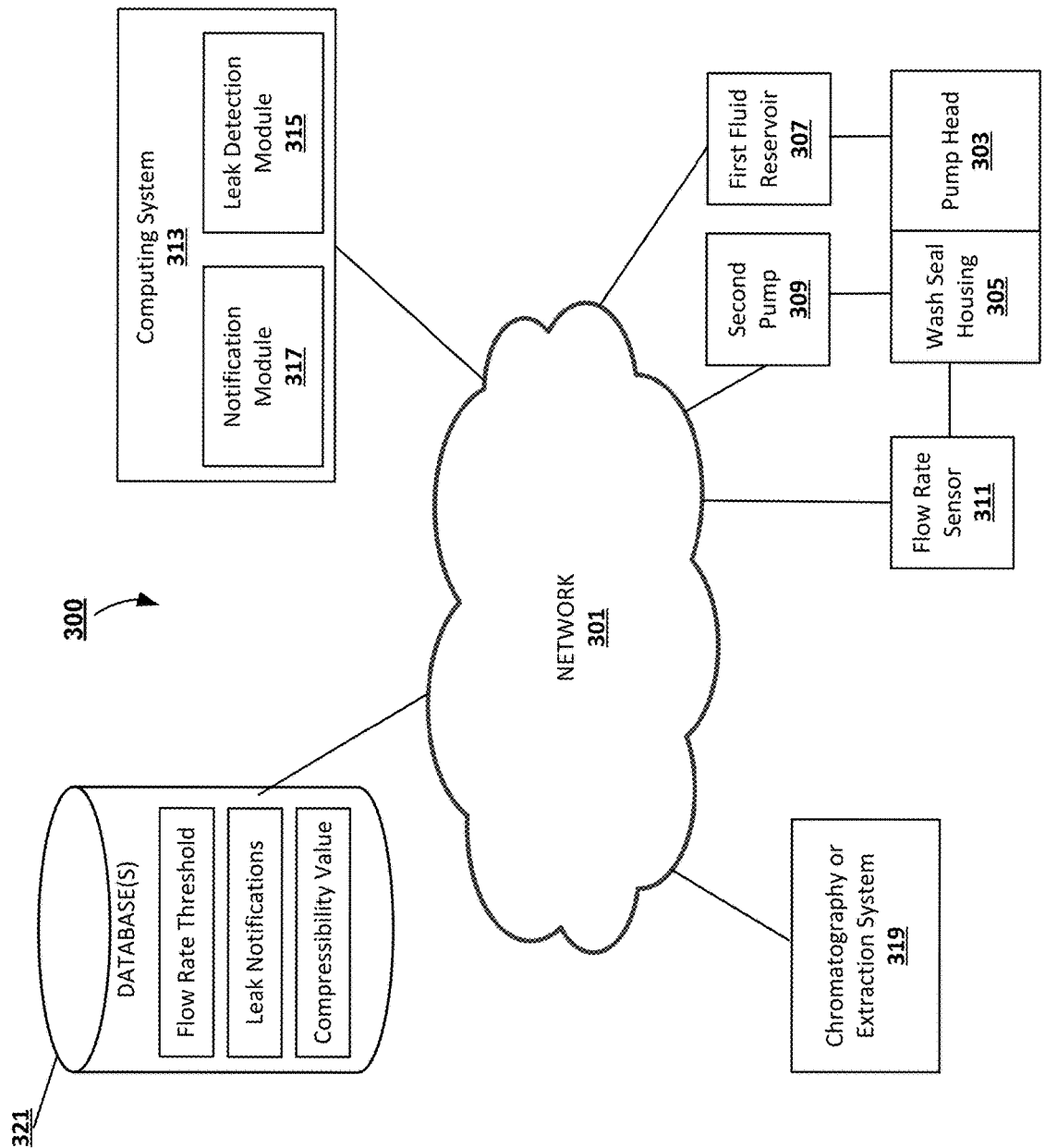
FIG. 3 is a diagram of an example network environment suitable for a distributed implementation, according to principles of the present disclosure.

FIG. 3 illustrates a network diagram depicting a system 300 suitable for a distributed implementation of example systems described herein. The system 300 can include a network 301, a computing system 313, a chromatography or extraction system 319, and a database 321. The system 300 can also include components of a leak-detecting pump including a pump head 303, a wash seal housing 305, a first fluid reservoir 307 configured to provide a compressed fluid (e.g. a $CO_2$-based mobile phase) to the pump head 303, a second pump 309 configured to provide a wash fluid to the wash seal housing 305, and a flow rate sensor 311. As will be appreciated, the computing system 313 can be one or more local or remote servers, and various distributed or centralized configurations may be implemented. In exemplary embodiments, the computing system 313 can include one or more modules 315, 317, which can implement one or more of the processes described herein, or portions thereof, with reference to FIG. 1. For example, the computing system 313 can include a leak detection module 315 configured to detect a leak in the fluid seal and/or a notification module 317 configured to generate and transmit a notification to a user indicating that a leak has been detected. As discussed above, the pump can be configured to pump compressed $CO_2$ for use in a chromatography or extraction system 319.

In a non-limiting example, the computing system 313 and flow rate sensor 311 can communicate with each other and with the database 321 and at least one component of the chromatography or extraction system 319 to detect the existence of a leak in a fluid seal configured to seal the compressed fluid flowing through the pump head 303 from a wash fluid flowing through the wash seal housing 305.

In exemplary embodiments, the notification module 317 can transmit a notification to a user electronic device that may include, but is not limited to, a smart phone, tablet, laptop, computer, wearable computer, cellular or mobile phone, and the like.

In exemplary embodiments, the various components in the system 300 may be in communication with each other via a communication network 301. The communication network 301 may include, but is not limited to, the Internet, an intranet, a LAN (Local Area Network), a WAN (Wide Area Network), a MAN (Metropolitan Area Network), a wireless network, an optical network, and the like. In one embodiment, the components of the system 300 can transmit instructions to each other over the communication network 301. In exemplary embodiments, the flow rate measurement data, flow rate threshold, leak notifications, and the compressibility value(s) associated with the compressed fluid(s) configured to flow through the pump head can be stored at the database 321.

Figure 4:
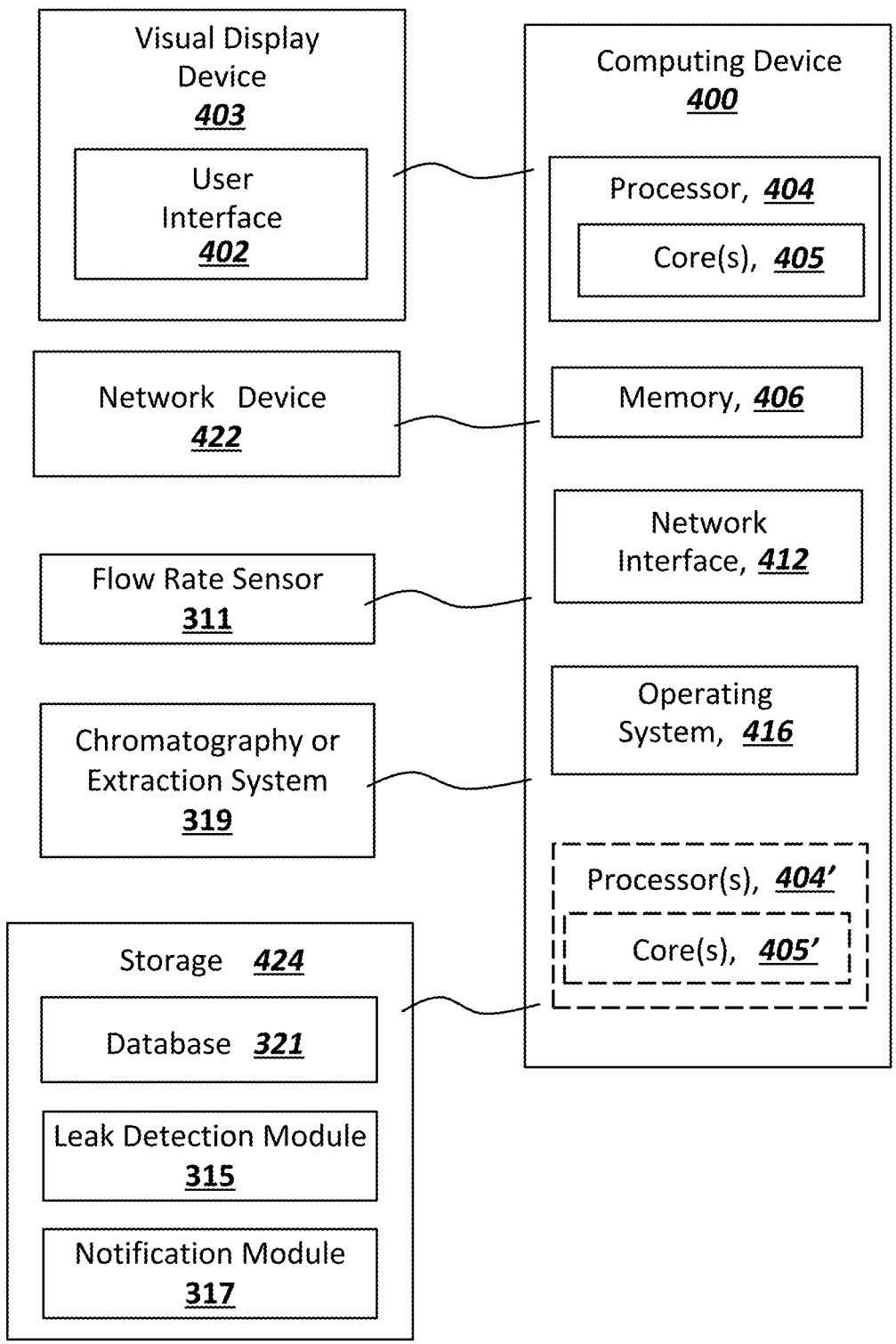
FIG. 4 is a block diagram of an example computing device that can be used to perform example processes and computations, according to principles of the present disclosure.

FIG. 4 is a block diagram of an exemplary computing device 400 that can be used in the performance of any of the example methods described herein (including example methodologies associated with FIG. 1). The non-transitory computer-readable media can include, but are not limited to, one or more types of hardware memory, non-transitory tangible media (e.g., one or more magnetic storage disks, solid state drives, etc.).

For example, memory 406 included in the computing device 400 can store computer-readable and computer-executable instructions or software for implementing exemplary embodiments described above in reference to FIG. 1. The computing device 400 also includes processing unit 404 (and associated core 405), and optionally, one or more additional processor(s) 404' and associated core(s) 405' for executing computer-readable and computer-executable instructions or software stored in the memory 406. Processing unit 404 and processor(s) 404' can each be a single core processor or multiple core (405 and 405') processor.

A user can interact with the computing device 400 through a visual display device 403, such as a touch screen display or computer monitor, which can display one or more user interfaces 402. The computing device 400 can also include one or more storage devices 424, such as a hard-drive, CD-ROM, or other non-transitory computer readable media, for storing data and computer-readable instructions and/or software, such as the leak detection module 315, notification module 317, and database 321 described above in reference to FIG. 3.

The computing device 400 can include a network interface 412 configured to interface via one or more network devices 421 with one or more networks, for example, Local Area Network (LAN), Wide Area Network (WAN) or the Internet through a variety of connections. The computing device 400 can also be in communication with a flow rate sensor 311 and one or more components of a chromatography or extraction system 319, as described above.

The computing device 400 can run any operating system 416, such as any of the versions of the Microsoft® Windows® operating systems, the different releases of the Unix and Linux operating systems, any version of the MacOS®, or any other operating system capable of running on the computing device 400 and performing the operations described herein.

In describing example embodiments, specific terminology is used for the sake of clarity. For purposes of description, each specific term is intended to at least include all technical and functional equivalents that operate in a similar manner to accomplish a similar purpose. Additionally, in some instances where a particular example embodiment includes a plurality of system elements, device components or method steps, those elements, components or steps can be replaced with a single element, component or step. Likewise, a single element, component or step can be replaced with a plurality of elements, components or steps that serve the same purpose. Moreover, while example embodiments have been shown and described with references to particular embodiments thereof, those of ordinary skill in the art will understand that various substitutions and alterations in form and detail can be made therein without departing from the scope of the disclosure. Further still, other aspects, functions and advantages are also within the scope of the disclosure.

Example flowcharts are provided herein for illustrative purposes and are non-limiting examples of methodologies. One of ordinary skill in the art will recognize that example methodologies can include more or fewer steps than those illustrated in the example flowcharts, and that the steps in the example flowcharts can be performed in a different order than the order shown in the illustrative flowcharts.

In alternative embodiments, the techniques described above with respect to pumps and other elements used in $CO_2$-based chromatography systems may be applicable to pumps and other elements used in other types of chromatography systems that include mobile phases that are highly compressible. In describing certain examples, specific terminology is used for the sake of clarity. For purposes of description, each specific term is intended to at least include all technical and functional equivalents that operate in a similar manner to accomplish a similar purpose. Additionally, in some instances where a particular example embodiment includes a plurality of system elements, device components or method steps, those elements, components or steps may be replaced with a single element, component or step. Likewise, a single element, component or step may be replaced with a plurality of elements, components or steps that serve the same purpose. Moreover, while example embodiments have been shown and described with references to particular embodiments thereof, those of ordinary skill in the art will understand that various substitutions and alterations in form and detail may be made therein without departing from the scope of the invention.

What is claimed is:

1. A method for detecting leaks within a pump comprising:
providing a compressed fluid through a first channel formed within a pump head, wherein the compressed fluid within the first channel is in contact with at least a portion of a pump piston and the first channel is substantially sealed using a fluid seal positioned around a portion of the pump piston;
providing a wash fluid into a second channel formed within a wash seal housing associated with the pump head using a fluid pump, wherein the wash fluid within the second channel surrounds a portion of the pump piston and is separated from the first channel by the fluid seal;
measuring a flow rate of fluid exiting the wash seal housing via the second channel; and
determining existence of a leak in the fluid seal based on the measured flow rate, wherein determining the existence of a leak in the fluid seal includes detecting a bubble in the fluid exiting the wash seal housing using a bubble detector.

2. The method of claim 1, wherein the compressed fluid includes compressed $CO_2$ for a $CO_2$-based chromatography or extraction system.

3. The method of claim 1, wherein determining the existence of a leak in the fluid seal includes comparing the measured flow rate exiting the wash seal housing against a flow rate threshold value.

4. The method of claim 1, wherein a sensitivity value of the bubble detector is determined based on a compressibility value associated with the compressed fluid being pumped through the first channel.

5. The method of claim 1, further comprising:
changing a pump speed of the pump piston in response to a detected leak in the fluid seal in order to maintain a constant flow rate of the fluid exiting the pump head.

6. The method of claim 1, further comprising:
generating a notification to a user indicating that a leak has been detected.

7. The method of claim 1, wherein determining the existence of a leak includes measuring a composition of the wash fluid against a nominal value, and the composition of the wash fluid is determined by a refractive index measurement.

8. A system for detecting leaks in a pump comprising:
a pump head including an interior portion defining a first channel within the pump head;
a first fluid reservoir configured to direct a compressed fluid through the first channel;
a pump piston configured to partially move within the first channel such that the compressed fluid within the first channel is in contact with at least a portion of the pump piston;
a fluid seal positioned around a portion of the pump piston to substantially seal the first channel;
a wash seal housing associated with the pump head and including an interior portion defining a second channel within the wash seal housing;
a fluid supply configured to provide a wash fluid through the second channel such that the wash fluid surrounds a portion of the pump piston and is separated from the first channel by the fluid seal; and
a flow rate sensor configured to measure a flow rate of fluid exiting the wash seal housing via the second channel, wherein the flow rate sensor includes a bubble detector configured to detect a bubble in the fluid exiting the wash seal housing.

9. The system of claim 8, further comprising a computing device configured to:
control operation of the pump piston and the fluid supply; and
determine an existence of a leak in the fluid seal based on the flow rate measured by the flow rate sensor.

10. The system of claim 9, wherein the computing device is further configured to change a pump speed of the pump piston in response to a leak detected in the fluid seal in order to maintain a constant flow rate of the fluid exiting the pump head.

11. The system of claim 9, wherein the computing device is further configured to generate a notification to a user indicating that a leak has been detected.

12. The system of claim 9, wherein the computing device is further configured to compare the measured flow rate exiting the wash seal housing against a flow rate threshold value.

13. The system of claim 9, wherein determining the existence of a leak includes measuring a composition of the wash fluid against a nominal value, and the composition of the wash fluid is determined by a refractive index measurement.

14. The system of claim 8, wherein the first fluid reservoir is configured to provide compressed $CO_2$ to the pump head for use in a $CO_2$-based chromatography or extraction system.

15. The system of claim 8, wherein a sensitivity value of the bubble detector is determined based on a compressibility value associated with the compressed fluid being pumped through the first channel.

16. A method for detecting leaks within a $CO_2$ pump comprising:
- providing compressed $CO_2$ through a first channel formed within a pump head, wherein the compressed $CO_2$ within the first channel is in contact with at least a portion of a pump piston and the first channel is substantially sealed using a fluid seal positioned around a portion of the pump piston;
- providing a wash fluid into a second channel formed within a wash seal housing associated with the pump head using a fluid pump, wherein the wash fluid within the second channel surrounds a portion of the pump piston and is separated from the first channel by the fluid seal;
- measuring a flow rate of fluid exiting the wash seal housing via the second channel;
- comparing the measured flow rate of the fluid exiting the wash seal housing via the second channel against a flow rate threshold value; and
- determining existence of a leak in the fluid seal if the measured flow rate is higher than the flow rate threshold value, and if a bubble is detected exiting the second channel.

17. The method of claim 16, further comprising:
- changing a pump speed of the pump piston in response to a detected leak in the fluid seal in order to maintain a constant flow rate of the compressed $CO_2$ exiting the pump head.

18. The method of claim 16, further comprising:
- generating a notification to a user indicating that a leak has been detected.

* * * * *